ANDREW B. HAMMITT
HERBERT L. BIRUM, JR.
*INVENTORS*

BY Albert Sperry.

ATTORNEY 3,139,960
THREAD COUPLING STRUCTURE
Andrew B. Hammitt, 909 W. State St., Trenton, N.J., and Herbert L. Birum, Jr., Titusville, N.J.; said Birum assignor to said Hammitt
Filed Feb. 23, 1961, Ser. No. 91,023
3 Claims. (Cl. 189—34)

This invention relates to thread coupling structures for receiving and retaining one or more bolts and is directed particularly to constructions formed of extruded material and having a slot extending lengthwise thereof adapted to receive a bolt at any point throughout the length of the slot.

The reissue patent to Bloedow, No. 24,133, describes and claims a type of thread coupling structure adapted to be formed of extruded material and having a slot therein provided with a series of similar ribs extending longitudinally of the slot on opposite faces of the slot with the ribs on one face intermediate the ribs on the opposite face so as to receive and engage the helical threads on a bolt.

Constructions of this type have been widely used and have particular application in batten strips and partition assemblies designed to secure wall forming material in place in a building structure. However, it has been found that vibration, expansion and contraction, or other movement of the wall forming material or of the batten strips or elements tend to cause the bolts engaging the thread coupling structure to become loosened or displaced so that it is necessary to go over the structure and tighten the bolts from time to time. This is particularly true when the elements embodying the thread coupling structure are used on the exterior of a building or in other locations where it is desirable to provide an effective water-tight seal between the batten strips or other members and the surface of a sheet of wall forming material.

It has also been suggested heretofore that self-tapping screws be forced or driven into a slot in a member which is provided with parallel opposed faces which may or may not be roughened or grooved. However, when using such constructions, the slotted member must be backed up or securely held in place so as to oppose the pressure required to drive or force the self-tapping screw into the slot as it cuts its own thread in the opposing faces of the slot.

In accordance with the present invention, an improved type of thread coupling structure is provided which serves to retain and hold a bolt more securely in place and in a manner which prevents the bolts from becoming loosened. The construction further serves to guide and force the bolt into the slot in a manner which renders it unnecessary to back up or support the member when threading a bolt into the slot.

This result is preferably attained by providing a member with a slot therein having opposed parallel faces with different types of thread engaging ribs thereon. Some of said ribs, hereafter termed "bolt-guiding ribs," are preferably V-shaped in cross-section and are spaced and arranged to correspond generally with the thread on a bolt of predetermined size adapted to be received in the slot. Other bolt-engaging ribs, hereafter termed "bolt-gripping ribs," are formed to present an inwardly facing surface in which the bolt will cut its own thread so that the bolt will be gripped more firmly.

In the preferred form of the invention herein shown and described, those ribs on the opposed faces of the slot adjacent the edge or opening into the slot are bolt-guiding ribs while the bolt-gripping ribs are spaced from the edge or opening in the slot and are of greater width than the thread on the bolt. Constructions of this type not only serve to prevent loosening of the bolt but also provide greatly increased strength in the assembly in that much greater force is required to strip the bolt from the bolt-receiving slot.

Accordingly, the principal object of the invention is to provide a thread coupling structure with a slot having bolt-engaging ribs on opposite faces thereof which not only serve to guide a bolt but also serve to grip the bolt securely and in a manner to decrease danger of loosening of the bolt.

A further object of the invention is to provide a member having a slot therein with different types of bolt-engaging ribs located on the opposing faces of the slot.

A specific object of the invention is to provide a member with a bolt-receiving slot having bolt-engaging ribs thereon some of which serve as bolt-guiding ribs which facilitate the entry of a bolt into the slot and others of which are bolt-gripping ribs which serve to grip the bolt more securely and aid in holding the bolt in position.

These and other objects and features of the present invention will appear from the following description thereof wherein reference is made to the figures of the accompanying drawing.

Figure 1:
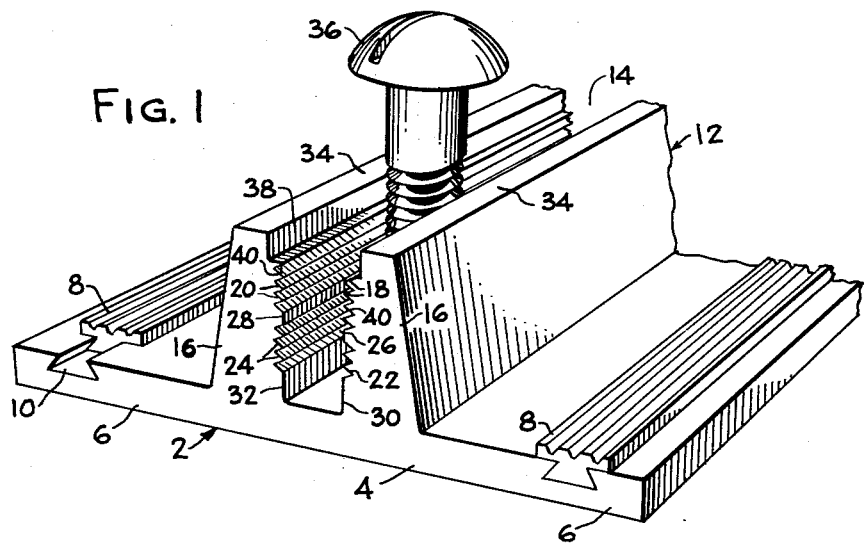
FIG. 1 is a perspective illustrating a typical embodiment of the present invention.

As shown in FIG. 1, the member 2 which is provided with the novel thread coupling structure is adapted to be formed of extruded metal or other material and has a uniform cross-section throughout the length thereof. The member illustrated is a batten strip of the type frequently used in securing sheets of wall-forming material in place in erecting a building, partition or other structure. The batten strip has a head portion 4 with side flanges 6 which may be provided with sealing elements such as the rubber, neoprene or plastic strips 8 which extend lengthwise of the side flanges on the inner surfaces thereof and are held in place by the grooves 10.

Figure 2:
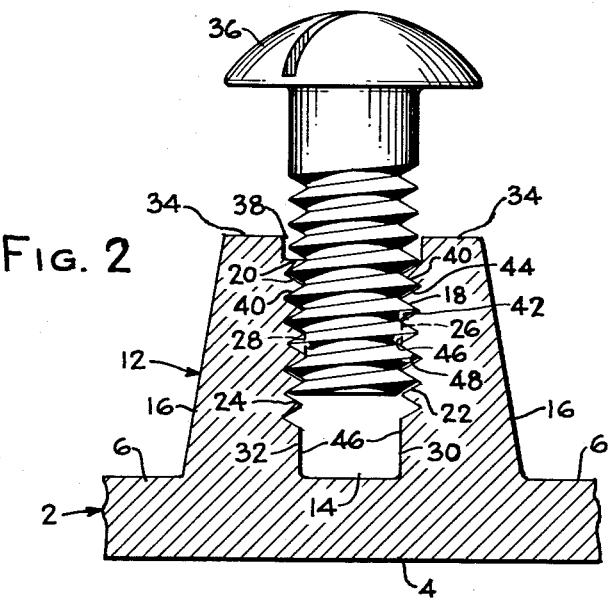
FIG. 2 is a sectional view through a portion of the construction shown in FIG. 1 at the point where a bolt is received thereby.

The central portion 12 of the strip is provided with a slot 14 having opposed fixed or rigid side walls 16 provided with parallel inwardly facing surfaces on which are formed longitudinally extending bolt-guiding ribs 18, 20, 22 and 24 and bolt-gripping ribs 26, 28, 30 and 32. The ribs 18 to 32 extend parallel to the outer edges or faces 34 of the side walls 16 which define the open side of the slot 14. The slot 14 is of sufficient width to receive a bolt 36 of predetermined diameter between the opposed inwardly facing walls thereof. Further, as shown in FIGS. 1 and 2, the slot 14 may be provided with an entry portion 38 which is wider than the portion of the slot on which the bolt-engaging ribs are formed to facilitate the insertion of a bolt into the slot.

The bolt-guiding ribs 18 and 20 are located on the opposite side faces of the slot 14 adjacent the open side or entrance into the slot. These ribs are of similar V-shaped cross-section and are arranged in staggered or intermediate relation with respect to each other on opposite faces of the slot so that, as shown in FIG. 2, they correspond generally in vertical cross-section to the longitudinal section of the bolt 36. The inner extremities or crests of the bolt-guiding ribs 18 and 20 are located in parallel planes so that the bolt-guiding ribs 18 and 20 are formed to guide and lead a bolt 36 of predetermined diameter and having threads of a predetermined pitch thereon into the slot 14 and to provide downwardly and outwardly inclined faces 40 against which the thread of the bolt may bear to exert a forward thrust on the bolt as it is rotated in being inserted into the slot.

The bolt-gripping rib 26 is positioned below the bolt-guiding ribs 18 on one side of the slot and has an upper edge 42 which may be inclined downwardly and inwardly parallel to the upper faces 44 of the bolt-guiding ribs 18 if desired. The upper edge 42 of the bolt-gripping rib 26 is positioned opposite the lowermost part of the bolt-guiding ribs 20 on the opposite side of the slot 14. The inner face 46 of the bolt-gripping rib 26 is preferably flat and preferably lies substantially in the same plane as the crests or inner extremities of the bolt-guiding ribs 18 or closely adjacent thereto. The surface 46 may be of any desired width but preferably is at least equal in width to the distance between the inner extremities of two adjacent bolt-guiding ribs. The lower edge 48 of the bolt-gripping rib 26 may be inclined outwardly and downwardly parallel to the lower faces 40 of the bolt-guiding ribs 18 if desired.

The bolt-gripping rib 28 on the opposite side of the slot 14 is positioned below the bolt-guiding ribs 20 and is similar in form to the bolt-gripping rib 26 in that it presents an inner surface which is flat and lies in substantially the same plane as the crests or inner extremities of the bolt-guiding ribs 20. Rib 28 is somewhat below the bolt-gripping rib 26 or in staggered relation with respect thereto. In the preferred construction shown in FIGS. 1 and 2, rib 28 is positioned a distance below the bolt-gripping rib 26 corresponding to the distance between the inner extremities of the bolt-guiding ribs 18 and 20.

As shown in FIGS. 1 and 2 of the drawing, the slot 14 may further be provided with additional bolt-guiding ribs 22 and 24 and has additional bolt gripping ribs 30 and 32 which are similar to those previously described but are arranged in alternate relation at greater depths within the slot 14 to further guide and grip the bolt 36 as it moves further into the slot 14.

In the construction described, the bolt-engaging ribs of the member 2 extend longitudinally of the slot 14 parallel to the edges 34 of the slot and, therefore, do not have any inclination or pitch lengthwise of the slot. However, the thread on the bolt 36 is of a helical form and, therefore, does have a pitch with respect to the axis of the bolt and with respect to each of the bolt-engaging ribs.

Accordingly, when the bolt 36 is rotated upon insertion into the slot 14, the leading end of the thread on the bolt will pass beneath the uppermost thread-guiding rib 18 and will bear against the lower and outwardly inclined face 40 of the rib 18. The bolt is thus drawn further into the slot as it is rotated. In a similar way the leading end of the thread on the bolt 36 will pass beneath the surface 40 of the uppermost bolt-guiding rib 20 on the opposite side of the slot 14 as the bolt is rotated through an angle of 180 degrees. The bolt is thus guided and drawn further into the slot.

Because of the pitch on the thread and the lack of any longitudinal pitch or inclination on the bolt-guiding ribs 18 and 20, the thread on the bolt is inclined with respect to the ribs and in most cases will cut across and partially distort the inner extremities of the ribs 18 and 20. This does not always occur to any great extent if there is considerable tolerance between the dimensions of the slot and ribs and the dimensions of the bolt and its thread. However, in all cases wherein the bolt is capable of passing into the slot with the thread on the bolt engaging the thread-guiding ribs 18 and 20, the thread will bear against the inwardly facing surfaces 40 of the ribs 18 and 20.

When the leading end of the thread on the bolt reaches the bolt-gripping rib 26, it cannot pass beneath the lower edge of the rib but instead must cut its own thread in the inner face 46 of the bolt-gripping rib. The length of the arc and the area of contact between the thread on the bolt and the bolt-gripping rib is thus substantially greater than that afforded by the bolt-guiding ribs 18 and 20. Moreover, in cutting its own thread in the surface 46 of the bolt-gripping rib, the thread on the bolt is in positive contact with the bolt-gripping rib throughout the length of the cut thread. There is no dimensional tolerance between the two. As a result, the bolt is gripped firmly by the bolt-gripping rib 26 and is held against displacement.

In the same way continued rotation of the bolt 36 serves to cause the thread on the bolt to cut its own thread in the bolt-gripping rib 28 on the opposite side of the slot 14. In this way the bolt 36 is positively and firmly gripped at its opposite sides and throughout a substantial portion of its entire circumference. As a result, the tendency for the bolt to become loosened due to vibration, expansion or contraction, or other movement of the bolt, the member 2, or the elements engaged thereby is greatly reduced. Moreover, the strength of the assembly produced is greatly increased in that much greater force is required to strip the bolt from the thread-receiving slot by shearing of the new combination of bolt-engaging ribs than is required when the slot is provided with bolt-guiding ribs only.

A further important feature of the construction resides in the fact that the member 2 does not need to be backed up or firmly supported in threading the bolt into the slot 14. Instead the surfaces 40 of the thread guiding ribs 18 and 20 engage the thread on the bolt and oppose any outward thrust exerted by the bolt as it cuts into the surfaces 46 of the bolt-gripping ribs 28 and 30. The bolt-guiding ribs thus serve to lead the bolt onward and into the slot 14 during the thread cutting operation.

As illustrated in FIGS. 1 and 2 of the drawing, the slot 14 is preferably provided with the additional bolt-guiding ribs 22 and 24 which are located below the thread-gripping ribs 18 and 20. Further, the slot is provided with additional bolt-gripping ribs 30 and 32 which are positioned adjacent the bottom of the slot 14. These additional ribs serve further to guide, thrust and grip the bolt as it enters further into the slot 14 and assure even more secure retention of the bolt by the member 2. As shown, the lower thread-gripping ribs 30 and 32 may have inwardly facing surfaces 46 which are of greater width than the corresponding surfaces of the ribs 26 and 28 whereby the inner end of the bolt will be gripped still more firmly as it is screwed down to its final position.

While the slot 14 preferably has bolt-gripping ribs formed on both of its opposing surfaces, these ribs may be formed on one face only of the slot if desired and no more than one thread-gripping rib is necessary in order to improve the retention of the bolt in the slot. However, by providing bolt-gripping ribs on both sides of the slot, a more effective and balanced retention of the bolt is assured. The bolt-gripping ribs may be positioned directly opposite to each other or arranged in offset or staggered positions as shown. Moreover, they may present an inwardly facing surface of any desired width exceeding the pitch of the thread on the bolt to be used.

Figure 3:
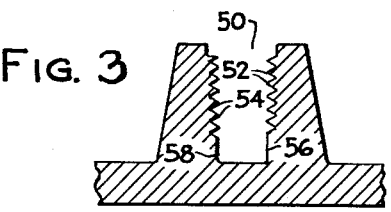
FIG. 3 is a sectional view through a portion of an alternative construction embodying the present invention.

Further, in the alternative as shown in FIG. 3, the slot 50 may be provided only with the upper bolt-guiding ribs 52 and 54 and with lower bolt-gripping ribs 56 and 58 located adjacent the bottom of the slot.

In a typical embodiment of the present invention the member 2 in which the bolt-receiving slot is formed may be produced as an aluminum extrusion. The body 4 of the member may have any desired cross-sectional form required for any functional application. Thus, the invention may be employed in various types of elements designed for use in erecting partitions or for securing sheet material in place. It may also be used in producing members designed for supporting shelving, scaffolding, or for securing substantially any other mechanical elements together.

It will also be apparent that the slot and the bolt-engaging ribs may be made of any desired size or dimensions to receive standard or special sizes, types and forms of bolts and threads as desired. The head of the bolt may, of course, be slotted, square, hexagonal or otherwise formed as desired.

In view thereof, it will be apparent that members embodying the present invention may have any of many different forms, shapes and uses. It should, therefore, be understood that the particular embodiment of the invention shown in the drawing and described above is intended to be illustrative only and is not intended to limit the scope of the invention.

We claim:

1. A thread coupling structure formed to receive a bolt having a predetermined diameter and a helical thread of predetermined pitch thereon, said structure being in the form of an elongated member of uniform cross-section throughout the length thereof and embodying two spaced rigid walls with parallel edges, said walls having an open sided slot therebetween presenting opposed faces spaced apart a sufficient distance to receive a bolt of said predetermined diameter therebetween, each of said faces being provided with a plurality of bolt-engaging ribs extending longitudinally of the slot parallel to said edges, the bolt-engaging ribs adjacent the open side of said slot and on said opposed faces of the slot being equally spaced bolt-guiding ribs presenting crests located in substantially parallel planes and arranged in intermediate, staggered and complementary opposed relation with respect to each other and spaced apart a distance equal to said predetermined pitch to cause a plurality of said bolt-guiding ribs to engage a plurality of turns of the thread on opposite sides of such a predetermined bolt upon screwing thereof into said slot, there being at least one other bolt-engaging rib on one of the faces of said slot, said other bolt-engaging rib being a bolt-gripping rib positioned below bolt-guiding ribs in the slot and presenting a substantially flat surface lying in a plane including the crests of the bolt-guiding ribs, said surface of the bolt-gripping rib being of a width at least equal to said predetermined pitch so that when such a predetermined bolt is screwed into said slot the thread thereon will first engage the thread guiding ribs and thereafter will cut a female thread in said surface of the bolt-gripping rib.

2. A thread coupling structure as defined in claim 1 wherein there is at least one bolt-gripping rib on each of the opposed faces of said slot.

3. A thread coupling structure as defined in claim 2 wherein the upper edges of said bolt-gripping ribs are inclined downwardly and inwardly and arranged in staggered relation with respect to each other.

References Cited in the file of this patent

UNITED STATES PATENTS

| | | |
|---|---|---|
| Re. 24,133 | Bloedow | Mar. 20, 1956 |
| 2,682,322 | Bloedow | June 29, 1954 |
| 3,001,567 | Brill | Sept. 26, 1961 |